Patented Dec. 5, 1950

2,532,814

UNITED STATES PATENT OFFICE 2,532,814

METHOD OF MAKING SPLIT BAMBOO RODS OR POLES

Wesley D. Jordan, Manchester, Vt., assignor to Charles F. Orvis Co. Inc., Manchester, Vt., a corporation of Vermont No Drawing. Application April 13, 1946, Serial No. 662,086

6 Claims. (Cl. 154—121)

The present invention relates to a method of manufacturing split poles or rods of bamboo, such as fishing rods, ski poles, vaulting poles, and golf shafts, and has for its object to provide a novel and improved method of this character.

In accordance with my invention, the sticks or segments of the poles or rods are cemented together and the material thereof is impregnated with suitable heat-hardening synthetic resins in such a manner that the resulting rod is of maximum strength, and is effectively protected from warping or otherwise becoming injuriously affected by weather conditions. For cementing purposes I have had satisfactory results with the use of a heat-hardening liquid phenol formaldehyde resin put out by Union Carbide and Carbon Company under the designation Bakelite XC-16582, and for impregnating purposes, a similar resin which is put out under the designation Bakelite BR-9581. Characteristics of these two resins are as follows:

|  | BR-9581 | XC-16582 |
|---|---|---|
| Solids Content—approximately | 60-65% | 38%. |
| Water—approximately | 40-35% | 62%. |
| Specific Gravity | 1.1550-1.1650 | 1.120-1.135. |
| Viscosity at 25° C | 60-90 centipoises | 390-560 centipoises. |
| Can be thinned with | water or alcohol | water or alcohol. |

Previously to cementing and impregnating, the bamboo may be cut and sorted as to length, quality and weight; then rough node sanded, split into halves, and the halves heat-treated to remove most of the moisture therefrom. The halves may be then cut into segmental sticks and the sticks more finely node-sanded and suitably milled to form the segments of a rod or rod section. These are the customary operations performed in making split bamboo poles or rods.

In accordance with my improved method the segments thus formed are loosely banded together into rods, there usually being four, six or eight segments to a rod. Rubber bands may be employed for this purpose. The segments thus loosely assembled are then dipped in a bath of Bakelite resin—No. XC-16582, the bath being at a temperature of 70° F. Such dipping of the segments is for the purpose of coating the adjacent surfaces thereof, and to ensure proper coating the resin may be worked between the surfaces by hand. As the loosely assembled segments are removed from the bath, they are wound tightly with string by means of a suitable winding machine so as to firmly bind them together throughout their length. The segments thus wound are then left to dry or cure for approximately four hours at room temperature in order to insure the resin penetrating the pores of the surfaces of the bamboo to be joined.

In case any of the assembled segments or rods need straightening, this may easily be done at this time by rolling them out on a flat surface and removing any kinks by hand in the usual manner.

The thus bonded rods are then placed in an oven and cured for approximately two hours at a temperature of 210° F. The temperature of the oven is then raised to approximately 285° F. and this temperature is maintained until the adhesive bond has become thoroughly set. This usually takes from one and one-half hours to two hours, depending on the diameter of the rod or rod section. The oven is then shut off and gradually allowed to cool, after which the rods may be removed.

The strings are then removed from the rods and the outer surfaces of the rods are cleaned and the ends trimmed. This cleaning operation may be done by means of a sandpaper wheel, and is such as not only to remove the Bakelite from the surfaces of the rods but also to remove all or most all of the natural enamel on the outer surfaces of the segments.

The rod or rod sections when thus cemented and cleaned are subjected to a bath of a resinous solution in such a manner as to effect thorough impregnation of the cells and fibers of the bamboo between the cemented joints.

In effecting such impregnation, the cemented and cleaned rods or rod sections may be first immersed in water at a temperature of 70° F., for a period of substantially twenty-four hours. The temperature of the water is then raised to 85° F. and gradually increased to 125° F. during a period from three to six days, depending on the diameter and length of the rod or rod section. This causes the rods or sections to be thoroughly saturated or waterlogged.

After waterlogging, the rods are immediately placed in a bath of Bakelite resin No. BR-9581, the bath consisting of two parts of the resin and one part water. The rods remain in this bath for from five to seven days, the bath being kept at a temperature of slightly under 75° F. This causes the Bakelite solution to thoroughly penetrate the cells and fibers of the bamboo, the impregnating occurring through the enamel-free outer surface of the segments as well as through their ends.

After the rods are removed from this bath and drained they may be hung or laid flat for twenty-four hours at room temperature. They are then again placed in the oven and cured approximately twelve hours at 180° F., then six hours at 210° F., and two to three hours at 285° F., the degree of temperature employed depending on the diameter of the rods. The oven is then allowed to slowly cool, after which the rods or rod sections are taken out, cleaned, and straightened for further fabricating.

The soaking or waterlogging of the rods, the impregnating in the resinous solution, and the subsequent curing necessarily subjects the rod to substantial expansion and contraction, but it has been found that in spite of this treatment the cemented joints effectively hold the segments together without weakening and prevents any material warping of the rod. The long soaking or waterlogging opens up the cells which are interconnected the entire length of the bamboo, thus permitting thorough penetration of the resinous solution through the material of the rod. The heated water dispersed through the expanded cells and between the fibers of the bamboo serves as a solvent for the impregnating solution, and a vehicle for the solution to insure thorough impregnation. While water is a solvent for the liquid resin, I have found that it does not attack the bond at the joints or seams during the waterlogging, and it is essential that any solvent employed for such soaking or waterlogging shall have those characteristics.

It has been found that by impregnating by my improved method as described, the bamboo may absorb the resin to an extent up to approximately 10 per cent. by weight depending on the size and quality of the cane.

While in order to insure thorough impregnation the bonded rods should be left in the heated water bath until they have become thoroughly saturated, such degree of saturation may not be necessary in some instances, particularly in the case of the coarser or more porous grades of cane.

During both the soaking and impregnating treatments, it is desirable to agitate the rods or the liquid and to keep the rods slightly separated so that during the soaking treatment any salts or other matter dissolved in the cane may separate and rise to the surface of the bath, and during the impregnating treatment the impregnating liquid may freely come in contact with the entire outer surfaces of the rods.

In a modification of this method of impregnating which I have devised, the initial soaking or waterlogging of the rods or rod sections in Bakelite-free water may be dispensed with. In this modification the rods or rod sections cemented and cleaned as above described are placed directly into a bath of solution consisting of two parts said liquid Bakelite resin—BR–No. 9581 and one part water. The bath is initially at substantially normal or room temperature of approximately 60 to 70° F. This bath is maintained at this temperature for about three days in the case of the heavier sections, such as the butts of fishing rods, and two days in the case of the tip sections of fishing rods. After this initial soaking, the temperature of the bath is quickly raised to approximately 100° F. and maintained at this temperature for about three hours and then the bath is quickly restored to room temperature. Such raising and lowering of the temperature is repeated each succeeding day until the seventh day in the case of the heavier sections and the sixth day in the case of the lighter sections from the time the sections were first placed in the bath. On the seventh and sixth days respectively, the temperature of the bath is quickly raised to about 125° F., and is maintained at this temperature for about one hour and then the temperature is quickly restored to normal.

The sections are then removed from the bath, allowed to drain off, and air dry at room temperature for twenty-four hours. They are then placed in the oven and heat-treated as described in connection with the method of impregnation previously described. The medium weight sections, such as the intermediate sections of a fishing rod, may be treated with the heavier or butt sections. The operator, however, should use his judgment depending on the diameters of the sections, both as to the length of time that they are subjected to the solution and also the temperature of the solution as may be required to secure the desired impregnation.

Care should be taken from day to day that the solution is kept at its initial specific gravity of between 1.1550 and 1.1650. The heating of the solution has been found to cause a certain amount of evaporation and, therefore, the solution should be checked from day to day by means of a hydrometer test to maintain the specific gravity of the solution within the limits mentioned.

The sections of the rod are preferably placed in the solution in groups according to their diameters. The advantage of this is not only that the sections of the same diameters will be uniformly treated, but also when they lay in the solution they will come in close contact and there is no tendency of the sections to bend by laying one upon the other.

The sections in the solution should be lifted twice a day and agitated so as to turn them over, and to insure keeping the solution uniform and of uniform temperatures throughout the bath.

The bath and intermediate sections, or sections of larger diameter, usually become thoroughly saturated or waterlogged with the solution in about four or five days, while the tips might become waterlogged in three or four days. However, they are preferably left for the remainder of the period described in the solution in order to insure thorough saturation.

This method of impregnating not only takes less time than the method first above described, but also it has been found that greater impregnation may be effected. Such increased impregnation is believed to be largely due to the abrupt raising of the temperature which causes expansion of the material and the opening up of the cells and hence allows the solution to more freely enter the cells, and effect a deeper penetration of the solution into the material. By thus limiting the periods of elevated temperatures, it has been found that the impregnating qualities of the Bakelite are not injuriously affected appreciably.

In another modification of the method of impregnating which I have successfully carried out, I start with a solution containing approximately equal parts of said liquid Bakelite and water, and gradually bring it up to two parts Bakelite and one part in the last three days of impregnating. The same variations in temperature are preferably employed, but the maximum temperatures may be somewhat less.

It has been found that while the abrupt raising and lowering of the temperature of the solution together with the waterlogging of the rods in the solution subjects the rod to substantial expansion and contraction, the previously heat-treated Bakelite cemented joints effectively hold the segments together without weakening, and the firmness and rigidity of the joints prevents any material warping of the rods during the treatment.

In the case of each of these modifications of my method of impregnation, after the rods are removed from the bath they may be drained and dried at room temperature and then placed in an oven and cured in the same manner as in the case of rods impregnated in accordance with the method of impregnating first above described.

In all three forms, the impregnating fluid is thoroughly dispersed through the cells and fibers of the bamboo between the radially and longitudinally extending cemented joints, and when heat-treated unites with the cementing resin of the joints to form a solid integral flexible structure which is completely sealed inside and outside with the Bakelite resin. The resulting rod is waterproof, even impervious to boiling water and temperatures below zero, is effectively protected against deterioration or damage from microscopic animal life, stays "young" longer, is highly resistant to fracture or set, and is substantially free of "fatigue."

It is to be understood that the term "rod" as used in the claims shall include rod sections such as the sections of a fishing pole, also shafts of ski poles and golf clubs, and other objects in the form of a rod, pole, or shaft.

As will be evident to those skilled in the art, my invention permits various modifications without departing from the spirit thereof or the scope of the appended claims.

This application is a continuation in part of my pending application Ser. No. 531,761, filed April 19, 1944, now abandoned, which in turn is a continuation in part of forfeited application Ser. No. 495,069, filed July 16, 1943.

What I claim is:

1. The method of making a rod of split bamboo which comprises assembling previously dried segmental sticks of bamboo with the natural enamel sides thereof facing outwardly, while maintaining the sticks loosely assembled, applying a heat-hardening liquid resin between the adjacent surfaces of the sticks, then tightly clamping the sticks together throughout their lengths and while thus held heat-treating them to cause the resin to become set to secure the sticks together, cleaning the surface of the rod thus formed to free it of resin and natural enamel of the bamboo, waterlogging the cleaned rod, while waterlogged impregnating the material of the rod with a heat-hardening liquid resin, and after impregnating heat-treating the rod to set the impregnating material.

2. The method of making a rod of split bamboo which comprises applying a heat-hardening liquid resin to the surfaces to be joined of previously dried segmental bamboo sticks that are to form the rod, tightly clamping the sticks together in assembled relation throughout their lengths, the sticks being arranged with their natural enamel sides facing outwardly, while the sticks are thus held partly drying them at substantially room temperature and then heat-treating them to cause the resin to become set to secure the sticks together, cleaning the surface of the rod thus formed to free it of resin and natural enamel of the bamboo, waterlogging the cleaned rod, the water-logging bath being initially at substantially room temperature and the temperature being gradually raised during the treatment, while waterlogged subjecting the material to a bath of a heat-hardening liquid resin until the resin has thoroughly impregnated the material of the rod, and after impregnating heat-treating the rod to set the impregnating material.

3. The method of making a rod of split bamboo which comprises applying a heat-hardening liquid resin to the surfaces to be joined of previously dried segmental bamboo sticks that are to form the rod, tightly clamping the sticks together in assembled relation throughout their lengths, the sticks being arranged with their natural enamel sides facing outwardly, while the sticks are thus held and after they are partly dried heat-treating them to cause the resin to become set to secure the sticks together, cleaning the surface of the rod thus formed to free it of resin and natural enamel of the bamboo, subjecting the cleaned rod to a bath of heat-hardening liquid resin solution, intermittently raising and lowering the temperature of the bath to effect expansion and contraction of the material of the rod, and when the rod has become thoroughly saturated with the solution removing the rod from the bath and heat-treating it to set the impregnating resin.

4. The method of making a rod of split bamboo which comprises applying a heat-hardening liquid resin to the surfaces to be joined of previously dried segmental bamboo sticks that are to form the rod, tightly clamping the sticks together in assembled relation throughout their lengths, the sticks being arranged with their natural enamel sides facing outwardly, while the sticks are thus held and after they are partly dried heat-treating them to cause the resin to become set to secure the sticks together, cleaning the surface of the rod thus formed to free it of resin and natural enamel of the bamboo, subjecting the cleaned rod to a bath of heat-hardening resin solution, quickly raising the temperature of the bath from room temperature to substantially 100° F. and after a period of approximately three hours restoring the temperature of the bath to room temperature, repeating such raising and lowering of the temperature each twenty-four hours until the material of the rod has become thoroughly saturated with the solution, then quickly raising the temperature of the bath from substantially room temperature to substantially 125° F. and maintaining it at said temperature for approximately one hour, and removing the rod from the bath and heat-treating it to set the impregnating solution.

5. The method of making a rod of split bamboo which comprises applying a heat-hardening liquid resin to the surfaces to be joined of previously dried segmental bamboo sticks that are to form the rod, tightly clamping the sticks together in assembled relation throughout their lengths, the sticks being arranged with their natural enamel sides facing outwardly, while the sticks are thus held and after they are partly dried heat-treating them to cause the resin to become set to secure the sticks together, cleaning the surface of the rod thus formed to free it of resin and natural enamel of the bamboo, subjecting the cleaned rod to a bath of heat-hardening liquid resin solution until the rod is thoroughly saturated with the solution, and then removing the rod from the bath and heat-treating it to set the impregnating resin.

6. The method of making a rod of split bamboo which comprises applying a heat-hardening liquid resin to the surfaces to be joined of previously dried segmental bamboo sticks that are to form the rod, tightly clamping the sticks together in assembled relation throughout their lengths, the sticks being arranged with their natural enamel sides facing outwardly, while the sticks are thus held and after they are partly dried heat-treating them to cause the resin to become set to secure the sticks together, cleaning the surface of the rod thus formed to free it of resin and natural enamel of the bamboo, subjecting the cleaned rod to a bath of heat-hardening liquid resin solution containing approximately one part liquid resin and one part water until the material of the rod is substantially saturated with the solution, then gradually enriching the solution with liquid resin until the solution contains substantially two parts liquid resin and one part water, and after the rod has become thoroughly saturated with the solution removing the rod from the bath and heat-treating it to set the impregnating resin.

WESLEY D. JORDAN.

REFERENCES CITED

The following references are of record in the file of this patent:

UNITED STATES PATENTS

| Number | Name | Date |
|---|---|---|
| 602,797 | Annison | Apr. 19, 1898 |
| 1,713,683 | Wensel | May 21, 1929 |
| 1,834,895 | Brossman | Dec. 1, 1931 |
| 1,923,726 | Heghinian | Aug. 22, 1933 |
| 1,999,259 | Rozema | Apr. 30, 1935 |
| 2,020,172 | Cotchett | Nov. 5, 1935 |
| 2,104,494 | O'Brien | Jan. 4, 1938 |
| 2,207,157 | Neville et al. | July 9, 1940 |
| 2,350,135 | Stamm | May 30, 1944 |
| 2,352,740 | Shannon | July 4, 1944 |
| 2,364,849 | Ibbotson et al. | Dec. 12, 1944 |